United States Patent
Pedersen

(10) Patent No.: US 12,044,203 B2
(45) Date of Patent: Jul. 23, 2024

(54) METHOD FOR MANUFACTURING ROOT SEGMENT SECTIONS FOR A ROOT SEGMENT OF A TURBINE BLADE, METHOD FOR MANUFACTURING THE ROOT SEGMENT AND METHOD FOR MANUFACTURING THE TURBINE BLADE

(71) Applicant: Siemens Gamesa Renewable Energy A/S, Brande (DK)

(72) Inventor: David Stien Pedersen, Aalborg (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 253 days.

(21) Appl. No.: 17/089,933

(22) Filed: Nov. 5, 2020

(65) Prior Publication Data
US 2021/0148329 A1 May 20, 2021

(30) Foreign Application Priority Data
Nov. 14, 2019 (EP) .................................... 19209192

(51) Int. Cl.
*B29C 70/32* (2006.01)
*B29C 70/44* (2006.01)
(Continued)

(52) U.S. Cl.
CPC ............ *F03D 1/0675* (2013.01); *B29C 70/32* (2013.01); *B29C 70/443* (2013.01);
(Continued)

(58) Field of Classification Search
CPC ..... B29C 70/32; B29C 70/446; B29C 70/543; B29C 70/56; B29C 70/545
See application file for complete search history.

(56) References Cited

U.S. PATENT DOCUMENTS 2,814,313 A * 11/1957 Holbrook .............. B29C 53/825
156/190
4,260,332 A * 4/1981 Weingart .............. F03D 1/0658
416/226
(Continued)

FOREIGN PATENT DOCUMENTS

CN 1209090 A 2/1999
CN 1809450 A 7/2006
(Continued)

OTHER PUBLICATIONS

Wollner, B.A., Development of a fabric winding system for the automated manufacture of prefabricated wind turbine blade roots, Master of Science Thesis, Iowa State University (2011), 39 pages. (Year: 2011).*

(Continued)

*Primary Examiner* — Matthew J Daniels
(74) *Attorney, Agent, or Firm* — Schmeiser, Olsen & Watts LLP

(57) ABSTRACT

Provided is a method for manufacturing tapered root segment sections for a root segment of a turbine blade, in particular a wind turbine blade, wherein the method includes the steps of: (a) winding multiple layers of a fabric around a winding core in a way such that a multilayered structure from the fabric having a shape tapered transverse to a direction of the winding is obtained, (b) applying adhesive to the fabric, (c) curing the adhesive applied to the fabric of the multilayered structure wound around the winding core, so that a cured multilayered structure is obtained, (d) separating the cured multilayered structure from the winding core, and (e) cutting the cured multilayered structure into the tapered root segment sections. A method for manufacturing the root segment of the turbine blade and a method for manufacturing the turbine blade is also provided.

18 Claims, 4 Drawing Sheets

(51) Int. Cl.
  *B29C 70/54* (2006.01)
  *B29D 99/00* (2010.01)
  *F03D 1/06* (2006.01)
  *B29L 31/08* (2006.01)

(52) U.S. Cl.
  CPC .......... *B29C 70/446* (2013.01); *B29C 70/545* (2013.01); *B29D 99/0028* (2013.01); *B29L 2031/085* (2013.01); *F05B 2240/302* (2013.01)

(56) References Cited

U.S. PATENT DOCUMENTS

| | | | | |
|---|---|---|---|---|
| 4,412,784 | A * | 11/1983 | Wackerle | F03D 1/0658 416/241 A |
| 4,915,590 | A * | 4/1990 | Eckland | F03D 1/0658 403/267 |
| 6,390,406 | B1 | 5/2002 | Wood | |
| 8,066,490 | B2 * | 11/2011 | Babu | F03D 1/0658 416/209 |
| 8,382,440 | B2 * | 2/2013 | Baker | B29C 70/304 416/226 |
| 9,551,317 | B2 * | 1/2017 | Dahl | F03D 1/0658 |
| 9,897,066 | B2 * | 2/2018 | Hayden | F03D 1/06 |
| 9,970,304 | B2 * | 5/2018 | Caruso | B29C 66/72 |
| 10,024,298 | B2 * | 7/2018 | Kratmann | F03D 1/00 |
| 10,060,411 | B2 * | 8/2018 | Caruso | B29C 66/7394 |
| 10,190,571 | B2 * | 1/2019 | Samudrala | F03D 1/0658 |
| 11,408,392 | B2 * | 8/2022 | Smith | F03D 1/0658 |
| 2005/0106029 | A1 * | 5/2005 | Kildegaard | B29C 70/86 416/229 R |
| 2006/0083907 | A1 | 4/2006 | Bech et al. | |
| 2007/0065288 | A1 * | 3/2007 | Sorensen | B29C 70/86 416/222 |
| 2009/0114337 | A1 * | 5/2009 | Llorente Gonzalez | B29C 33/76 156/185 |
| 2011/0044817 | A1 * | 2/2011 | Bendel | F03D 1/0675 29/889 |
| 2011/0318186 | A1 * | 12/2011 | Kristensen | F03D 1/0658 416/219 R |
| 2012/0321480 | A1 * | 12/2012 | Guru Prasad | B29C 70/48 264/258 |
| 2013/0056914 | A1 * | 3/2013 | Frankowski | B29C 70/546 264/571 |
| 2013/0111752 | A1 * | 5/2013 | Madsen | F03D 1/065 29/889.7 |
| 2013/0276962 | A1 | 10/2013 | Burger | |
| 2013/0285284 | A1 * | 10/2013 | Moeller Larsen | B29C 70/86 425/500 |
| 2015/0266250 | A1 | 9/2015 | Hoffmann et al. | |
| 2016/0075425 | A1 | 3/2016 | Fong et al. | |
| 2020/0001562 | A1 | 1/2020 | Falko | |
| 2020/0346418 | A1 | 11/2020 | Stops et al. | |

FOREIGN PATENT DOCUMENTS

| | | |
|---|---|---|
| CN | 101223024 A | 7/2008 |
| CN | 105121277 A | 12/2015 |
| CN | 110100076 A | 8/2019 |
| DE | 102018100941 A1 | 7/2019 |
| WO | 2014072120 A1 | 5/2014 |

OTHER PUBLICATIONS

European Search Report and Written Opinion of the European Searching Authority issued May 14, 2020 for Application No. 19209192.4.

\* cited by examiner

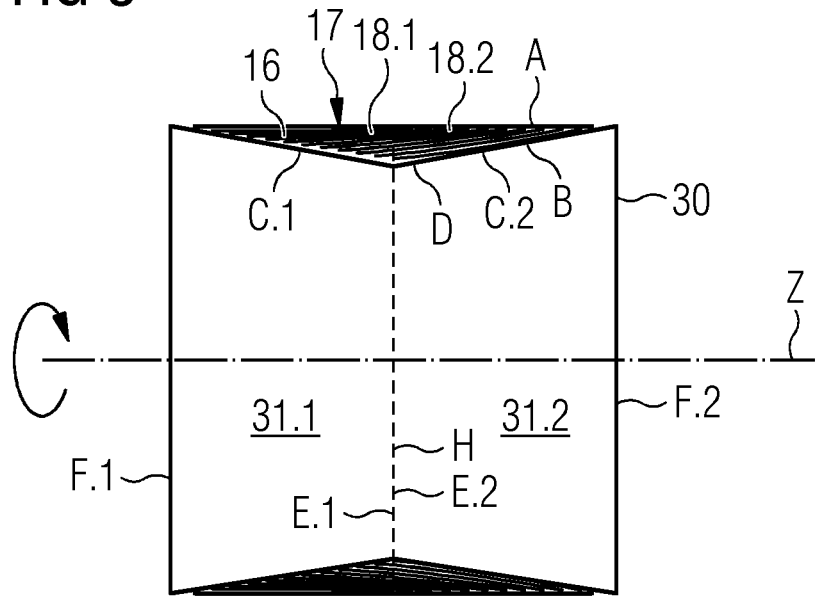
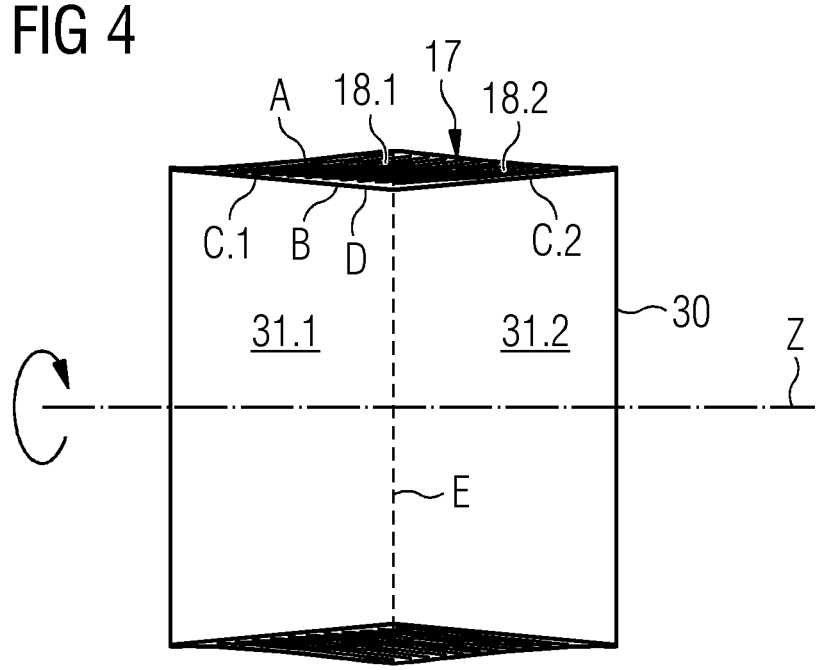

METHOD FOR MANUFACTURING ROOT SEGMENT SECTIONS FOR A ROOT SEGMENT OF A TURBINE BLADE, METHOD FOR MANUFACTURING THE ROOT SEGMENT AND METHOD FOR MANUFACTURING THE TURBINE BLADE

CROSS-REFERENCE TO RELATED APPLICATIONS

This application claims priority to EP Application No. 19209192.4, having a filing date of Nov. 14, 2019, the entire contents of which are hereby incorporated by reference.

FIELD OF TECHNOLOGY

The following relates to a method for manufacturing root segment sections for a root segment of a turbine blade, a method for manufacturing a root segment of a turbine blade and a method for manufacturing a turbine blade, in particular a wind turbine blade.

BACKGROUND

It is known to manufacture root segment sections for a root segment of a wind turbine blade for a wind turbine separately by forming the root segment sections from multiple layers of fabric in a desired round shape and casting them. The root segment sections are thereafter joined together by means of casting to obtain the substantially cylindrical root segment. This method of manufacturing is time-consuming and cost-intensive.

SUMMARY

An aspect relates to provide a method for manufacturing root segment sections for a root segment of a turbine blade, as well as a method for manufacturing the root segment and a method for manufacturing the turbine blade, which are simple, precise, time-efficient and cost-effective.

According to a first aspect of embodiments of the invention, the aspect is solved by means of a method for manufacturing tapered root segment sections for a root segment of a turbine blade, in particular a wind turbine blade, wherein the method comprises the steps of:
(a) winding multiple layers of a fabric around a winding core in a way such that a multilayered structure from the fabric having a shape tapered transverse to a direction of the winding is obtained,
(b) applying adhesive to the fabric,
(c) curing the adhesive applied to the fabric of the multilayered structure wound around the winding core, so that a cured multilayered structure is obtained,
(d) separating the cured multilayered structure from the winding core, and
(e) cutting the cured multilayered structure into the tapered root segment sections.

Thereby, multiple tapered root segment section may be provided with high preciseness and in a time-efficient and cost-effective manner, because these multiple tapered root segment sections are casted, meaning applying the adhesive and curing, at once and afterwards simply cut from the cured multilayered structure instead of separately manufacturing tapered root segment sections as known from the state of the art.

The tapered root segment sections may in particular have a round shape, i.e. be rounded and moreover in particular have a partially circular or elliptical shape such that when they are casted together form the root segment. Accordingly, the winding core may have a cylindrical shape and a circular or elliptical cross section. Thereby, a cylindrically shaped root segment of the turbine blade, in particular the wind turbine blade, may be manufactured. The root segment then has a cylindrical shape. The cross section of the root segment may have a circular or an elliptical shape.

The winding of the multiple layers of fabric is controlled, either manually or automatically, such that the tapered shape of the multilayered structure is built up. For this purpose, the layer of fabric wound around the winding core, which may also be referred to as a panel, may be moved relative to the winding core during the winding. Also, a roll from which the panel is supplied may be moved relative to the winding core. Alternatively, or additionally, the winding core itself may be moved relative to the panel and/or the roll, such that the tapered shape of the multilayered structure is built up. In particular, the multiple layers of fabric may be wound around the winding core in a way such that the multilayered structure from the fabric has a shape tapered perpendicular to the direction of the winding.

The adhesive may be a resin, such as an epoxy resin, or contain a resin, such as an epoxy resin, or a mix of different resins. The curing of the adhesive applied to the fabric of the multilayered structure wound around the winding core may be performed by heating the multilayered structure or by applying a self-curing adhesive.

The purpose of the winding core is to provide the shape of the cured multilayered structure. That is why the winding core is separated from the cured multilayered structure after the multilayered structure is cured. The cutting of the cured multilayered structure into the tapered root segment sections may be performed either by cutting through the cured multilayered structure such that separate tapered root segment sections are obtained or alternatively by cutting into but not through the cured multilayered structure such that tapered root segment sections are obtained, which however are still connected to one another at least in a part which is not cut through. It is important, that the tapered root segment sections may be pulled apart from one another for a large part such that a distance between them is created when they are later joined together once again to form the root segment, which will be explained later.

The fabric may contain glass fibers, carbon fibers and/or aramid fibers, for example, or any other fibers or mix of fibers. The winding core may be a hollow winding core, for example.

The cured multilayered structure is cut into the tapered root segment sections in a direction transverse, in particular at a degree in the range of 70° to 110°, to a circumference or direction of circumference of the cured multilayered structure, i.e. not along the circumference.

Moreover, the cured multilayered structure is cut into at least four root segment sections.

The winding of the multiple layers of the fabric on the winding core is performed in a way such that two adjacent multilayered structure portions of the multilayered structure from the fabric are obtained, each of the two adjacent multilayered structure portions having a shape tapered in an opposing direction. In particular, the adjacent multilayered structure portions may be adjacent multilayered structure halves of the multilayered structure. Also, the multilayered structure portions may be adjacent to one another such that they are connected with each other by means of the multiple layers of fabric.

Also, the cured multilayered structure is cut along a circumference between the two adjacent multilayered structure portions having the shapes tapered in the opposing directions. Thereby, effectively two portions are provided by means of only winding process on the winding core and thus twice as many tapered root segment sections may be provided very efficiently.

Further the winding core has the shape of a truncated cone. The truncated cone shape enables for a simple providing and controlling of a precisely tapered shape of the multilayered structure.

The winding core has the shape of a double truncated cone. This means that the winding core has two adjacent truncated cones as a shape. Thereby, it is easily possible to provide two adjacent multilayered structure portions of the multilayered structure.

Moreover, the shape of the double truncated cone of the winding core is a shape in which deck areas of two truncated cones of the double truncated cone are congruent with each other. A truncated cone as a geometrical shape has a deck area and opposite of that deck area a base area. The base area is larger than the deck area. When the deck areas of the truncated cones of the double truncated cone shape of the winding core are congruent with each other, or in other words are equal, than the winding process may be performed particularly easy and fast. That is because a double truncated cone shape with congruent deck areas has a V-shaped recess in between the truncated cones and thus the multiple layers of fabric may very easily be built up in that V-shaped recess.

The winding core is cut along a circumference between the two winding core portions, each of which has the shape of the truncated cone. By means of cutting the winding core in such a way, the winding core may be separated from the cured multilayered structure with ease.

The adhesive is applied to the fabric (a) by means of immersing the multiple layers of fabric into a bath prior to winding them around the winding core, and/or (b) by means of vacuum infusing the adhesive into the multilayered structure wound around the winding core. In the first case, the fabric is wound in a wet condition (wet from the adhesive) onto the winding core, whereas in the second case, the fabric is wound in a dry condition onto the winding core. This means, that the adhesive may be applied to the fabric prior to and/or after the winding.

The winding core has a smooth outer winding surface. The outer winding surface is the winding surface of the winding core onto which the multiple layers of fabric are wound. Thereby, the cured multilayered structure may be easily separated from the winding core.

Further, a release agent is applied on an outer winding surface of the winding core prior to winding the multiple layers of the fabric around the winding core. The release agent facilitates easy removal of the cured multilayered structure from the winding core.

According to a second aspect of embodiments of the invention, the aspect is solved by a method for manufacturing a root segment of a turbine blade, in particular a wind turbine blade, comprising the steps of:
(a) manufacturing multiple tapered root segment sections for the root segment of the turbine blade using the method according to the first aspect of embodiments of the invention,
(b) arranging the multiple tapered root segment sections in a round shape, in particular a cylindrical shape, and
(c) casting the arranged multiple tapered root segment sections to obtain the root segment.

The multiple tapered root segment sections are arranged at a distance from one another or with a gap in between each other in the round shape. This accounts for the deformation of the tapered root segment sections in the course of the casting process, in which high pressures are applied onto the tapered root segment sections.

According to a third aspect of embodiments of the invention, the aspect is solved by a method for manufacturing a turbine blade, in particular a wind turbine blade, comprising the steps of:
(a) manufacturing a root segment of the turbine blade using the method according to the second aspect of embodiments of the invention,
(b) arranging multiple layers of fabric on an outer side and an inner side of the root segment and connecting them to a portion of the turbine blade, and
(c) casting the multiple layers of fabric with the root segment and the portion of the turbine blade to obtain the turbine blade.

BRIEF DESCRIPTION

Some of the embodiments will be described in detail, with reference to the following figures, wherein like designations denote like members, wherein:

FIG. 3 shows a schematic front view on the method for manufacturing tapered root segment sections according to a second embodiment of the invention;

FIG. 4 shows a schematic front view on the method for manufacturing tapered root segment sections according to a third embodiment of the invention;

DETAILED DESCRIPTION

Figure 1:
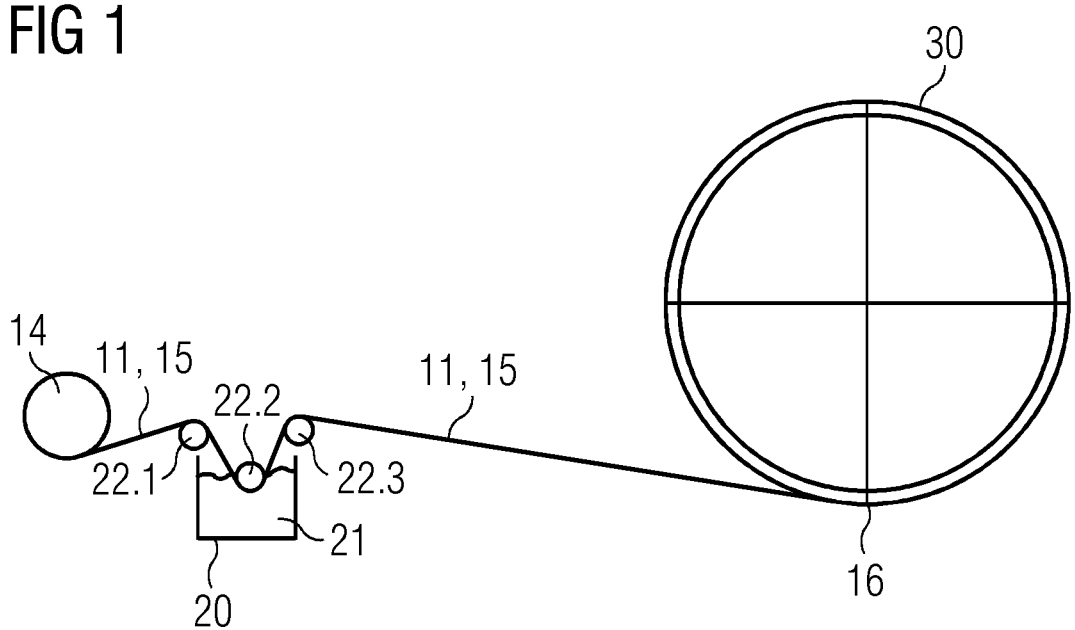
FIG. 1 shows a schematic side view on a method for manufacturing tapered root segment sections according to a first embodiment of the invention.

FIG. 1 shows a schematic side view on a method for manufacturing tapered root segment sections 19 according to a first embodiment of the invention.

A panel 15 of a fabric 11 is being unwound from a roll 14 of the fabric 11 and transferred via pulleys 22.1, 22.2 through a bath 20 containing adhesive 21. The adhesive 21 attaches to the panel 15 of the fabric 11 and is transferred via pulley 22.3 to a winding core 30. The panel 15 is wound onto the winding core 30 as multiple layers 16 of fabric 11.

Figure 2:
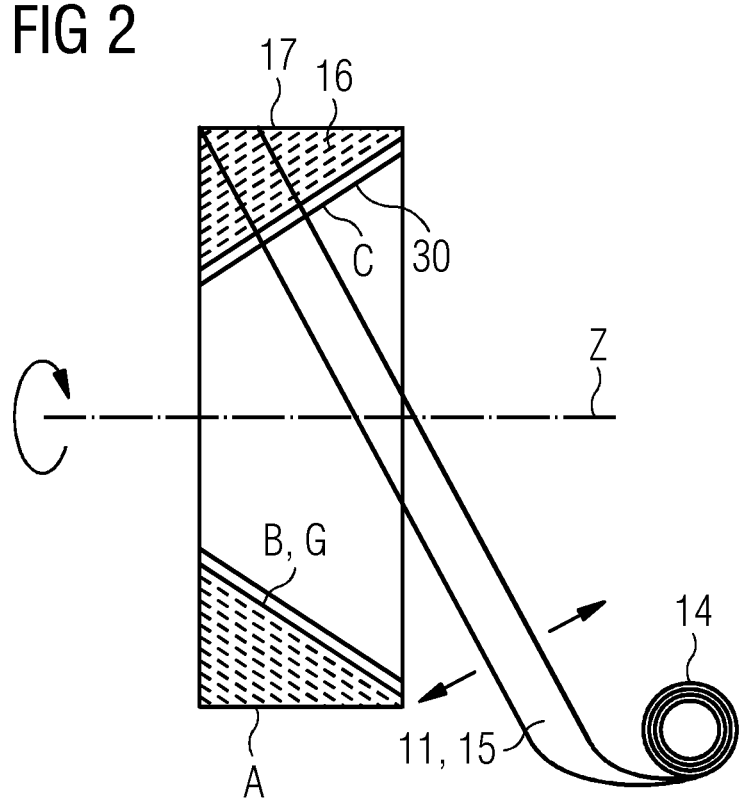
FIG. 2 shows a schematic front view on the method of FIG. 1.

FIG. 2 shows a schematic front view on the method of FIG. 1. From FIG. 2 it can be taken, that the winding core 30 is hollow and has the shape of a truncated cone C. The panel 15 of fabric 11 is wound from the roll 14 onto the winding core 30 in a way such that it is moved along the arrows placed next to the panel 15, indicating that the layers 16 of fabric 11 are consecutively built up on the winding core 30 such that a multilayered structure 17 made from the fabric 11 is provided on the outer winding surface G of the winding core 30. During the wounding, the winding core 30 is rotated around its winding core axis Z as indicated by the arrow placed next and circling the winding core axis Z.

The multilayered structure 17 may be cured together with the winding core 30 by applying heat to it, for example, or using a self-curing adhesive.

The multilayered structure 17 has a tapered shape, wherein the tapering runs perpendicular to a direction of the winding. The multilayered structure 17 has an outer side A and an inner side B arranged on the outer winding surface G, wherein the inner side B arranged on the winding core 30 is tapered towards the outer side A.

FIG. 3 shows a schematic front view on the method for manufacturing tapered root segment sections 19 according to a second embodiment of the invention.

In contrast to the first embodiment of the invention according to FIG. 2, in FIG. 3 the winding core 30 has the shape of a double truncated cone D. In particular, the shape of the double truncated cone D is such that deck areas E.1, E.2 of the two truncated cones C.1, C.2 of the double truncated cone D are congruent with each other. Each of the deck areas E.1, E.2 is opposite to the base area F.1, F.2 of its respective truncated cone C.1, C.2.

The winding process itself is not shown in the FIG. 3 or any of the further figures anymore. However, due to the shape of a double truncated cone D, there is a V-shaped recess provided in the winding core 30, such that the multilayered structure 17 is built up having a triangular shape. There is a first cutting line H, along which the multilayered structure 17 may be cut such as to provide two multilayered structure portions 18.1, 18.2, in particular halves. The first cutting line H runs along the circumference of the multilayered structure 17. Further, the winding core 30 may be cut along first cutting line H so as to split the winding core 30 into two winding core portions 31 enabling easy separation of the multilayered structure portions 18.1, 18.2 from the winding core 30. The first cutting line H also runs along the circumference of the winding core 30.

Because the outer winding surface G in the second embodiment of the invention is larger than in the first embodiment of the invention, a panel 15 of larger width may be used for winding the layers 16 of fabric 11 onto the winding core 30, whereby the winding process is accelerated.

FIG. 4 shows a schematic front view on the method for manufacturing tapered root segment sections 19 according to a third embodiment of the invention.

In contrast to the second embodiment of the invention according to FIG. 3, in FIG. 4 the V-shaped recess is smaller. Hence, the multilayered structure 17 is built onto the winding core 30 in a diamond like shape.

Figure 5:
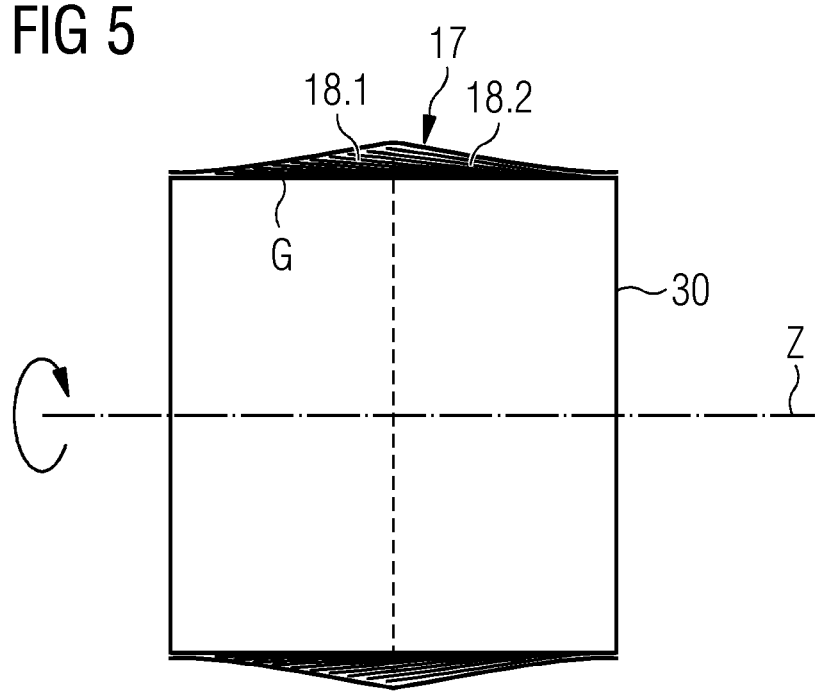
FIG. 5 shows a schematic front view on the method for manufacturing tapered root segment sections according to a fourth embodiment of the invention.

FIG. 5 shows a schematic front view on the method for manufacturing tapered root segment sections 19 according to a fourth embodiment of the invention.

In contrast to the embodiments of the invention according to FIGS. 2 to 4, in FIG. 5 the winding core 30 has the shape of a cylinder. The multilayered structure 30 is built up in a triangular shape but on top of the straight outer winding surface G of the winding core 30, so that the winding process is more challenging to provide a tapered shape of desired preciseness compared to the embodiments of FIGS. 2 and 3 but an easier to manufacture shape of the winding core 30 may be used.

Figure 6:
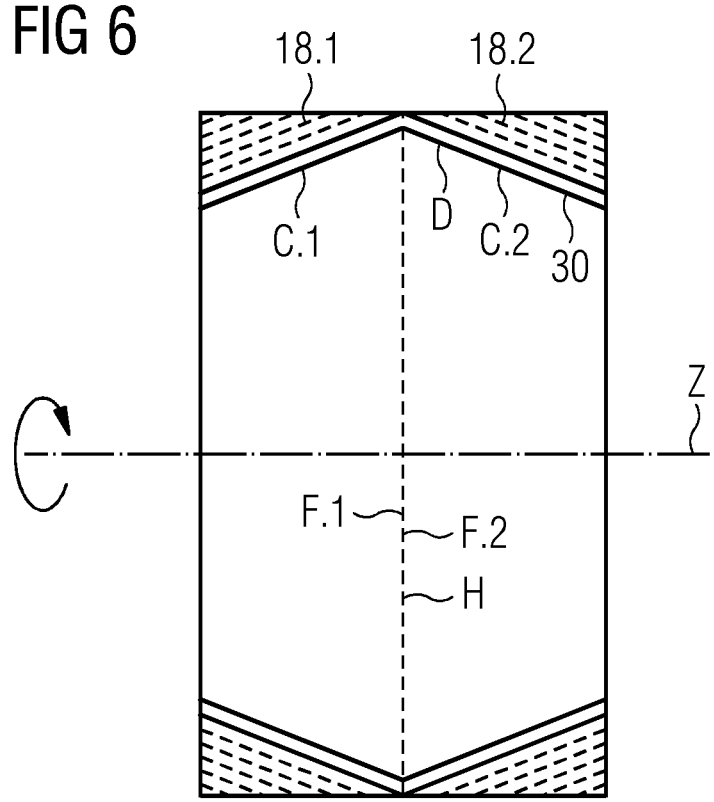
FIG. 6 shows a schematic front view on the method for manufacturing tapered root segment sections according to a fifth embodiment of the invention.

FIG. 6 shows a schematic front view on the method for manufacturing tapered root segment sections 19 according to a fifth embodiment of the invention.

In contrast the embodiment of the invention according to FIG. 3, in FIG. 6 the winding core 30 the shape of the double truncated cone D such that base areas F.1, F.2 of the two truncated cones C.1, C.2 of the double truncated cone D are congruent with each other.

Figure 7:
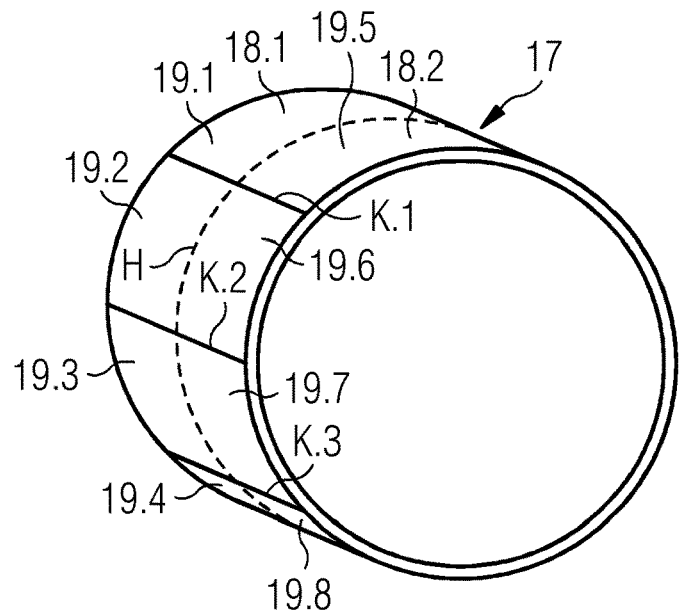
FIG. 7 shows a schematic side perspective view on a cured multilayered structure separated from a winding core and manufactured by means of the method according to FIG. 3.

FIG. 7 shows a schematic side perspective view on a cured multilayered structure 17 separated from a winding core 30 and manufactured by means of the method according to FIG. 3.

The cured multilayered structure 17 is cut along first cutting line H into the two multilayered structure portions 18.1, 18.2, being halves of the cured multilayered structure 17. Further, the cured multilayered structure 17 is cut along the shown second cutting lines K.1, K.2, K.3 running perpendicular to the first cutting line H. Thereby, multiple tapered root segment sections 19.1, 19.2, 19.3, 19.4, 19.5, 19.6, 19.7, 19.8 are provided.

Figure 8:
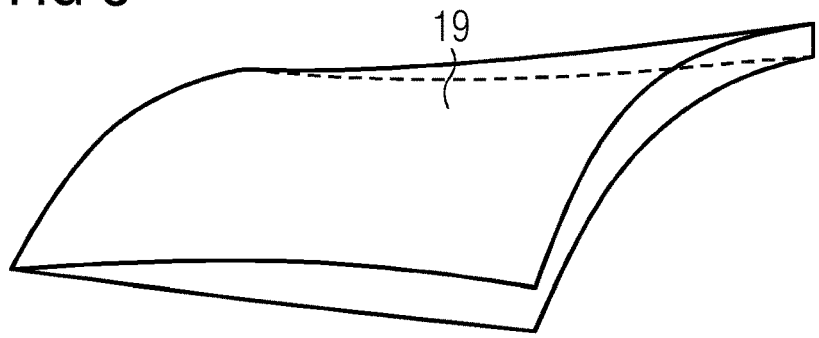
FIG. 8 shows a schematic side perspective view on a tapered root segment section.

FIG. 8 shows a schematic side perspective view on a tapered root segment section 19.

The tapered root segment section 19, as cut from the cured multilayered structure 17 of FIG. 7, is tapered along its length and has a rounded shape. In particular, the tapered root segment section 19 has a partially circular or elliptical shape transverse, in particular perpendicular, to its length. Thereby, multiple of the tapered root segment sections 19 may be arranged at a distance from one another, when they are cut through from one another, or with a gap in between each other, when they are cut into, and casted such that they form a cylindrical root segment having a circular or elliptical cross section.

Figure 9:
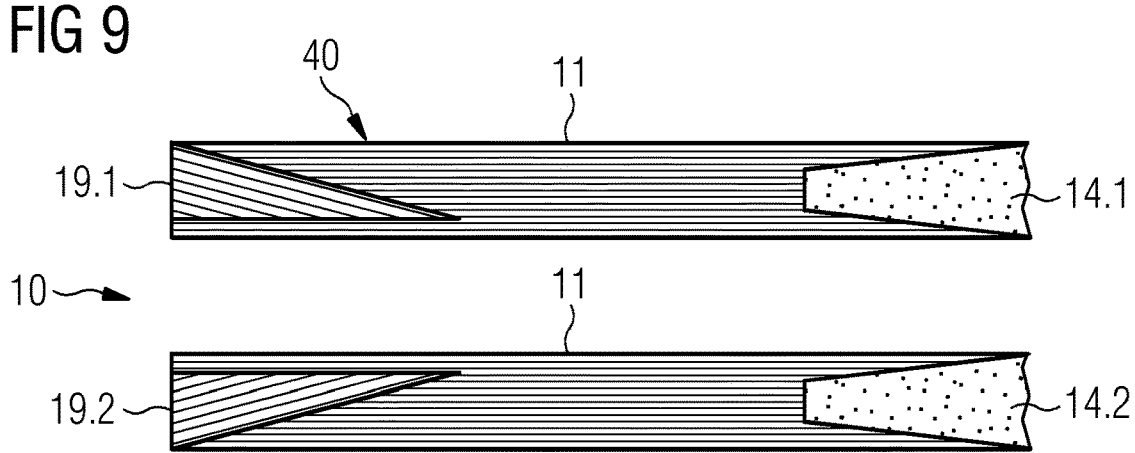
FIG. 9 shows a schematic sectional view through a wind turbine blade manufactured according an embodiment of a method for manufacturing a turbine blade according to the invention.

FIG. 9 shows a schematic sectional view through a wind turbine blade 40 manufactured according an embodiment of a method for manufacturing a turbine blade 40 according to embodiments of the invention.

The root segment 10 has the tapered root segment sections 19 casted together with multiple layers of fabric 11 arranged on them with further portions 41.1, 41.2 of the turbine blade 40.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for manufacturing a root segment of a turbine blade, comprising the steps of:
   (a) manufacturing multiple tapered root segment sections for the root segment of the turbine blade, wherein each tapered root segment section of the tapered root segment sections forms a portion of a circumference of the root segment, by winding multiple layers of a fabric around a winding core in a way such that a multilayered structure from the fabric having a shape tapered transverse to a direction of the winding is obtained; applying adhesive to the fabric; curing the adhesive applied to the fabric of the multilayered structure wound around the winding core, so that a cured multilayered structure is obtained; separating the cured multilayered structure from the winding core; and cutting the cured multilayered structure into the multiple tapered root segment sections in a direction transverse to a circumference of the cured multilayered structure, wherein the cured multilayered structure is cut into at least four root segment sections, (b) arranging the multiple tapered root segment sections in a round shape, wherein a gap is provided between adjacent root segment sections, and (c) casting the arranged multiple tapered root segment sections to obtain the root segment.

2. The method according to claim 1, wherein the winding of the multiple layers of the fabric on the winding core is performed in a way such that two adjacent multilayered structure portions of the multilayered structure from the fabric are obtained, each of the two adjacent multilayered structure portions having a shape tapered in an opposing direction.

3. The method according to claim 2, wherein the cured multilayered structure is cut along a circumference between the two adjacent multilayered structure portions having the shapes tapered in the opposing directions.

4. The method according to claim 1, wherein the winding core has the shape of a single truncated cone or a double truncated cone.

5. The method according to claim 4, wherein the shape of the double truncated cone of the winding core is a shape in which deck areas of two truncated cones of the double truncated cone are congruent with each other.

6. The method according to claim 5, wherein the winding core is cut along a circumference between the two winding core portions, each of which has the shape of the truncated cone.

7. The method according to claim 1, wherein the adhesive is applied to the fabric by
    (c) immersing the multiple layers of fabric into a bath prior to winding them around the winding core, and/or
    (d) by vacuum infusing the adhesive into the multilayered structure wound around the winding core.

8. The method according to claim 1, wherein the winding core has a smooth outer winding surface.

9. The method according to claim 1, wherein a release agent is applied on an outer winding surface of the winding core prior to winding the multiple layers of the fabric around the winding core.

10. A method for manufacturing a turbine blade, comprising the steps of:
    (a) manufacturing a root segment of the turbine blade by manufacturing multiple tapered root segment sections for the root segment of the turbine blade, wherein each tapered root segment section of the tapered root segment sections forms a portion of a circumference of the root segment, wherein manufacturing multiple tapered root segment sections includes winding multiple layers of a fabric around a winding core in a way such that a multilayered structure from the fabric having a shape tapered transverse to a direction of the winding is obtained; applying adhesive to the fabric; curing the adhesive applied to the fabric of the multilayered structure wound around the winding core, so that a cured multilayered structure is obtained; separating the cured multilayered structure from the winding core; and cutting the cured multilayered structure into the multiple tapered root segment sections in a direction transverse to a circumference of the cured multilayered structure, arranging the multiple tapered root segment sections in a round shape, and casting the arranged multiple tapered root segment sections to obtain the root segment wherein a distance is provided between adjacent root segment sections;

(b) arranging multiple layers of fabric on an outer side and an inner side of the root segment and connecting them to a portion of the turbine blade, and (c) casting the multiple layers of fabric with the root segment and the portion of the turbine blade to obtain the turbine blade.

11. The method according to claim 10, wherein the winding of the multiple layers of the fabric on the winding core is performed in a way such that two adjacent multilayered structure portions of the multilayered structure from the fabric are obtained, each of the two adjacent multilayered structure portions having a shape tapered in an opposing direction.

12. The method according to claim 11, wherein the cured multilayered structure is cut along a circumference between the two adjacent multilayered structure portions having the shapes tapered in the opposing directions.

13. The method according to claim 10, wherein the winding core has the shape of a single truncated cone or a double truncated cone.

14. The method according to claim 13, wherein the shape of the double truncated cone of the winding core is a shape in which deck areas of two truncated cones of the double truncated cone are congruent with each other.

15. The method according to claim 14, wherein the winding core is cut along a circumference between the two winding core portions, each of which has the shape of the truncated cone.

16. The method according to claim 10, wherein the adhesive is applied to the fabric by
    (a) immersing the multiple layers of fabric into a bath prior to winding them around the winding core, and/or
    (b) by vacuum infusing the adhesive into the multilayered structure wound around the winding core.

17. The method according to claim 10, wherein the winding core has a smooth outer winding surface.

18. The method according to claim 10, wherein a release agent is applied on an outer winding surface of the winding core prior to winding the multiple layers of the fabric around the winding core.

* * * * *